United States Patent [19]

Mennemann et al.

[11] Patent Number: 4,642,297
[45] Date of Patent: Feb. 10, 1987

[54] OPTICAL GLASS WITH REFRACTIVE INDEXES OF 1.60–1.69 AND ABBE NUMBERS OF AT LEAST 54 WITH PARTICULARLY GOOD CHEMICAL STABILITY

[75] Inventors: Karl Mennemann, Taunusstein; Danuta Grabowski geb. Marszalek, Wiesbaden, both of Fed. Rep. of Germany

[73] Assignee: Schott Glaswerke, Fed. Rep. of Germany

[21] Appl. No.: 458,506

[22] Filed: Jan. 17, 1983

[30] Foreign Application Priority Data

Jan. 22, 1982 [DE] Fed. Rep. of Germany ....... 3201943

[51] Int. Cl.[4] ............................ C03C 3/08; C03C 3/30
[52] U.S. Cl. ........................................ 501/78; 501/903
[58] Field of Search .................... 501/78, 903

[56] References Cited

U.S. PATENT DOCUMENTS

| 2,745,757 | 5/1956 | Geffcken | 501/78 |
| 3,248,238 | 4/1966 | Faulstich | 501/78 |
| 3,510,325 | 5/1970 | Broemer et al. | 501/78 |
| 3,958,999 | 5/1976 | Izumitani et al. | 501/78 |
| 4,055,435 | 10/1977 | Sagara | 501/78 |

FOREIGN PATENT DOCUMENTS

| 52-11210 | 1/1977 | Japan | 501/78 |
| 53-133218 | 11/1978 | Japan | 501/78 |
| 54-3115 | 1/1979 | Japan | 501/78 |
| 56-78447 | 6/1981 | Japan | 501/78 |

*Primary Examiner*—Mark Bell
*Attorney, Agent, or Firm*—Haight & Associates

[57] ABSTRACT

Optical glass compositions having refractive indexes of 1.60–1.69 and Abbe numbers higher than 54 as well as with a density of less than 3.4 g/cm$^3$, and which are distinguished in that they have good chemical stability, comprising (in percent by weight): 5–30 percent $SiO_2$; 20–55 percent $B_2O_3$; 13–40 percent CaO; 3–25 percent $La_2O_3$; and optionally one or more of the following: up to 7 percent $ZrO_2$, up to 2 percent $TiO_2$, up to 9 percent $Al_2O_3$, up to 11 percent MgO, up to 10 percent ZnO, up to 10 percent SrO, and up to 12 percent BaO.

2 Claims, No Drawings

OPTICAL GLASS WITH REFRACTIVE INDEXES OF 1.60-1.69 AND ABBE NUMBERS OF AT LEAST 54 WITH PARTICULARLY LOW DENSITY AND PARTICULARLY GOOD CHEMICAL STABILITY

DESCRIPTION OF THE INVENTION

1. Technical Field of the Invention

This invention relates to a new optical glass which is distinguished from known glasses of the same optical type in that it has a significantly lower density and improved chemical stability.

2. Background Art

Whereas known crown glasses of this optical type are molten in a glass system of $SiO_2$—$B_2O_3$—$BaO$ (with very high BaO percentages of up to 50 percent by weight), the glasses according to the present invention comprise the essential components $SiO_2$—$B_2O_3$—$CaO$—$La_2O_3$.

DISCLOSURE OF THE INVENTION

Accordingly, it is a general object of the present invention to provide an optical quality crown glass combining the properties of a high refractive index, a high Abbe number, a low density, and good chemical stability.

Another object of the present invention is to provide such glass compositions which contain less than 12 percent by weight BaO.

A further object of the present invention is to provide glass compositions having a refractive index of 1.635–1.645, an Abbe number of at least 59.8, and a density not greater than 3.0 $g/cm^3$.

An additional object of the present invention is to provide glass compositions having a refractive index of 1.670–1.685, an Abbe number of at least 54, and a density not greater than 3.4 $g/cm^3$.

A more particular object of the present invention is to provide lens blanks and polished spectacle lenses made from the novel glass compositions herein.

Upon study of the specification and appended claims, further objects, features and advantages of the present invention will become more fully apparent to those skilled in the art to which this invention pertains.

BEST MODE FOR CARRYING OUT THE INVENTION

Briefly, the above and other objects, features and advantages of the present invention are attained in one aspect thereof by providing a glass composition comprising 5–30 percent by weight, preferably 6–19 percent by weight, $SiO_2$ and 20–55 percent by weight, preferably 29–53 percent by weight $B_2O_3$. In order to guarantee refractive indexes higher than 1.60, preferably 1.62–1.68 or even higher, and simultaneously a low density of less than 3.5 $g/cm^3$, preferably 2.9–3.3 $g/cm^3$, CaO is required in an amount of 13–40 percent by weight, preferably 20–29 percent by weight. $La_2O_3$ is added in amounts of 3–25 percent by weight, preferably 11–25 percent by weight, in order to improve the chemical stability of the glass, particularly its acid resistance.

To this basic glass system, one or more additional components may be added as required: 1–7 percent by weight $ZrO_2$ significantly raises the refractive index and resistance to acids, although the Abbe number drops. 1–10 percent by weight ZnO, 1 to 12 percent by weight BaO, 1–10 percent by weight SrO, and 1–9 percent by weight MgO are optional components, as well as 1–9 percent by weight $Al_2O_3$ and 1–2 percent by weight $TiO_2$. As $TiO_2$ lowers the Abbe number very strongly, even in small amounts, its addition must be made judiciously.

In the following table, two known glasses (LaK21 and LaKN12, seen SCHOTT Catalogue No. 311d, 1980) are compared with two glasses according to the present invention; $\rho$ is density in $g/cm^3$. SR is resistance to acids as defined in the above cited SCHOTT Catalog, the contents of which are incorporated by reference herein. Briefly, this chemical or acid resistance is determined by: Removal of a 0,1$\mu$ layer by acid (pH=4,6; acetate standard buffer solution) at 25° C. in time units (seconds). Example: For LaK N12 removal of a 0,1$\mu$ layer takes place in 20 seconds.

|  | LaK 21 | Example 6 | LaK N12 | Example 2 |
| --- | --- | --- | --- | --- |
| nd | 1.6405 | 1.6410 | 1.6779 | 1.6770 |
| vd | 60.10 | 60.10 | 55.10 | 55.10 |
| $\rho$ | 3.74 | 2.97 | 4.10 | 3.32 |
| SR | 55 (40") | 53 (70") | 53 (20") | 52 (300") |

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever. In the following Examples, the temperatures are set forth uncorrected in degrees Celsius; unless otherwise indicated, all parts and percentages are by weight.

EXAMPLES 1-7

The glasses according to the invention are produced according to techniques known in the art, e.g. in the following manner: The components (oxides, carbonates and nitrates) are weighed out according to the desired formula. Refining agents, e.g. $As_2O_3$ or $Sb_2O_3$, are added in quantities of 0.1 to 1 percent by weight. This preparation is well mixed and melted down in a ceramic tank or in a platinum crucible at 1250°–1350° C., refined and homogenized, and than allowed to cool while being stirred down to a casting temperature of 1000°–1080° C. The melt is then poured into iron moulds or further mechanically processed, e.g. by press moulding. By way of example, the table headed "Sample Melts" lists seven typical examples of melt compositions and their properties.

| | Sample Melts | | | | | | |
| --- | --- | --- | --- | --- | --- | --- | --- |
| Sample | 1 | 2 | 3 | 4 | 5 | 6 | 7 |
| $SiO_2$ | 28.35 | 17.00 | 18.00 | 27.30 | 19.65 | 8.60 | 20.00 |
| $B_2O_3$ | 22.50 | 30.40 | 36.50 | 26.40 | 36.60 | 49.25 | 37.00 |
| MgO | 6.90 | 2.10 | 5.50 | 7.50 | — | — | 2.0 |
| CaO | 15.10 | 22.10 | 24.00 | 16.70 | 39.10 | 27.80 | 16.50 |
| $La_2O_3$ | 11.40 | 22.25 | 4.65 | 4.20 | 4.20 | 13.10 | 13.50 |
| $ZrO_2$ | 2.10 | 6.15 | 0.45 | 0.50 | 0.45 | 1.25 | 5.50 |
| BaO | 7.10 | — | 10.90 | — | — | — | — |
| ZnO | — | — | — | 9.50 | — | — | — |
| $Al_2O_3$ | 6.55 | — | — | 7.90 | — | — | — |
| SrO | — | — | — | — | — | — | 4.0 |
| $TiO_2$ | — | — | — | — | — | — | 1.5 |
| nd | 1.6215 | 1.6770 | 1.6290 | 1.6040 | 1.6360 | 1.6410 | 1.6410 |
| vd | 58.00 | 55.10 | 60.00 | 58.00 | 58.70 | 60.10 | 53.40 |
| $\rho$ | 3.03 | 3.32 | 3.07 | 2.95 | 2.91 | 2.97 | 3.01 |

The preceding examples can be repeated with similar success by substituting the generically or specifically described reactants and/or operaing conditions of this invention for those specifically used in the examples. From the foregoing description, one skilled in the art to which this invention pertains can easily ascertain the essential characteristics thereof and, without departing from the spirit and scope of the present invention, can make various changes and modifications to adapt it to various usages and conditions.

INDUSTRIAL APPLICABILITY

As can be seen from the present specification and examples, the present invention is industrially useful in providing a new type of optical crown glass suitable for high quality applications such as in the manufacture of eyeglass lenses.

What is claimed is:

1. An optical quality crown glass having a refractive index of about 1.6410, an Abbe number of about 60.10, an acid resistance of class SR 53 and a density of about 2.97 g/cm$^3$ and consisting essentially of the following composition, in percent by weight:

| | | |
|---|---|---|
| $SiO_2$ | 8.60 | percent |
| $B_2O_3$ | 49.25 | percent |
| $SiO_2 + B_2O_3$ | 57.85 | percent |
| CaO | 27.80 | percent |
| $La_2O_3$ | 13.10 | percent |
| $ZrO_2$ | 1.25 | percent. |

2. An optical quality crown glass having a refractive index of about 1.6770, an Abbe number of about 55.10, an acid resistance of class SR 52, a density of about 3.32 g/cm$^3$ and consisting essentially of the following composition, in percent by weight:

| | | |
|---|---|---|
| $SiO_2$ | 17.00 | percent |
| $B_2O_3$ | 30.40 | percent |
| $SiO_2 + B_2O_3$ | 47.40 | percent |
| CaO | 22.10 | percent |
| MgO | 2.10 | percent |
| $La_2O_3$ | 22.25 | percent |
| $ZrO_2$ | 6.15 | percent. |

* * * * *